US012474305B2

(12) United States Patent
Casset et al.

(10) Patent No.: US 12,474,305 B2
(45) Date of Patent: Nov. 18, 2025

(54) SUBMERSIBLE ENVIRONMENTAL SENSOR INCORPORATING ANTI-FOULING MEANS

(71) Applicant: COMMISSARIAT A L'ENERGIE ATOMIQUE ET AUX ENERGIES ALTERNATIVES, Paris (FR)

(72) Inventors: Fabrice Casset, Grenoble (FR); Thomas Alava, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 498 days.

(21) Appl. No.: 18/002,123

(22) PCT Filed: Jun. 17, 2021

(86) PCT No.: PCT/FR2021/051098
§ 371 (c)(1),
(2) Date: Jun. 8, 2023

(87) PCT Pub. No.: WO2021/255396
PCT Pub. Date: Dec. 23, 2021

(65) Prior Publication Data

US 2023/0304970 A1 Sep. 28, 2023

(30) Foreign Application Priority Data

Jun. 19, 2020 (FR) ...................................... 20 06432

(51) Int. Cl.
*G01N 29/32* (2006.01)
*B08B 7/02* (2006.01)
(Continued)

(52) U.S. Cl.
CPC ............... *G01N 29/32* (2013.01); *B08B 7/02* (2013.01); *B08B 13/00* (2013.01); *B08B 17/02* (2013.01);
(Continued)

(58) Field of Classification Search
CPC .... G01N 29/32; G01N 29/024; G01N 29/036; G01N 29/222; G01N 2291/0256;
(Continued)

(56) References Cited

U.S. PATENT DOCUMENTS 8,018,121 B1 9/2011 Cular
2006/0032290 A1 2/2006 Liu
(Continued)

FOREIGN PATENT DOCUMENTS

EP 3 715 826 A1 9/2020
WO WO-2008020887 A2 * 2/2008 ............ B08B 17/00
WO WO 2019/194166 A1 10/2019

OTHER PUBLICATIONS

International Search Report issued Oct. 8, 2021 in PCT/FR2021/051098, filed on Jun. 17, 2021, 3 pages.
(Continued)

*Primary Examiner* — Benjamin R Schmitt
(74) *Attorney, Agent, or Firm* — Oblon, McClelland, Maier & Neustadt, L.L.P.

(57) ABSTRACT

A method for controlling a submersible environmental sensor, the sensor including a support having a face which includes a sensitive zone configured to receive at least one species of interest (SOI), anti-fouling means configured to cause at least the sensitive zone to vibrate, and detection means for detecting a presence of the SOI on the sensitive zone, the detection means and the anti-fouling means being carried by the support, wherein the anti-fouling means includes actuators configured to cause the medium to vibrate in a standing mode with a wavelength 3-20 times the size of the SOI to confine the SOI on the sensitive zone, includes activating the anti-fouling means in a de-fouling mode, stopping the anti-fouling means, activating the anti-fouling means to confine the SOI in the sensitive zone, and stopping
(Continued)

the anti-fouling means. The method also includes activating the detection means and stopping the detection means.

16 Claims, 5 Drawing Sheets

(51) Int. Cl.

| | |
|---|---|
| ***B08B 13/00*** | (2006.01) |
| ***B08B 17/02*** | (2006.01) |
| ***G01N 29/024*** | (2006.01) |
| ***G01N 29/036*** | (2006.01) |
| ***G01N 29/22*** | (2006.01) |

(52) U.S. Cl.
CPC ......... *G01N 29/024* (2013.01); *G01N 29/036* (2013.01); *G01N 29/222* (2013.01); *G01N 2291/0256* (2013.01); *G01N 2291/0258* (2013.01)

(58) Field of Classification Search
CPC .. G01N 2291/0258; B08B 7/02; B08B 13/00; B08B 17/02
See application file for complete search history.

(56) References Cited

U.S. PATENT DOCUMENTS

| | | | |
|---|---|---|---|
| 2008/0035180 A1 | 2/2008 | Mutharasan et al. | |
| 2010/0042389 A1* | 2/2010 | Farruggia ............... | B08B 17/00 134/184 |
| 2016/0244715 A1 | 8/2016 | Casset et al. | |
| 2020/0309665 A1 | 10/2020 | Schneider et al. | |

OTHER PUBLICATIONS

French Preliminary Search Report issued Feb. 24, 2021 in French Application 20 06432, filed on Jun. 19, 2020, 12 pages (with English Translation of categories of Cited Documents & Written Opinion).

Lei "Formation of inverse Chladni patterns in liquids at microscale: roles of acoustic radiation and streaming-induced drag forces", Microfluid Nanofluid, 2017, vol. 21, No. 50, 15 pages.

Vuillermet et al. "Chladni Patterns in a Liquid at Microscale", Physical Review Letters 116, 2016, 4 pages.

Yang et al. "Detection of *Escherichia coli* with a label-free impedimetric biosensor based on lectin functionalized mixed self- assembled monolayer", Science Direct, vol. 229, 2016, pp. 297-304 (4 pages).

Backmann et al. "A label-free immunosensor array using single-chain antibody fragments", PNAS, vol. 102, No. 41, 2005, 6 pages.

Radi et al. "An electrochemical immunosensor for ochratoxin A based on immobilization of antibodies on diazonium-functionalized gold electrode", Electrochimica Acta, vol. 54, Issue 8, 2009, pp. 2180-2184 (3 pages).

Casset et al "Low voltage actuated plate for haptic applications with PZT thin-film", IEEE Conference Publication, IEEE Xplore, 2013, 2 pages.

Liu et al. "Aptamer-Based Electrochemical Biosensor for Interferon Gamma Detection", ACS Publications, Analytical Chemistry, 2010, 14 pages.

Neff et al. "Piezoelectric Actuated Glass Plate for Liquid density and Viscosity Measurement", Micromachines, vol. 11, No. 4, 2020, 12 pages.

Moser et al. "A Scalable ISFET Sensing and Memory Array with Sensor Auto-Calibration for On-Chip Real-Time DNA Detection", IEEE Transactions on Biomedical Circuits and Systems, vol. 12, No. 2, 2018, 12 pages.

* cited by examiner

SUBMERSIBLE ENVIRONMENTAL SENSOR INCORPORATING ANTI-FOULING MEANS

TECHNICAL FIELD AND STATE OF PRIOR ART

The present invention relates to a liquid medium environmental sensor incorporating anti-fouling means.

An environmental sensor in a liquid medium may be designed to monitor properties of the medium, for example its pH, density, etc., or to measure various characteristics such as turbidity, the presence of chemical species or some strains of bacteria, etc.

These sensors can be used in industrial environments, for example they can be submerged in tanks, pipes or in natural environments, such as seas, oceans, rivers and canals. A large number of submersible environmental sensors are used. These sensors are often implemented on existing structures, such as offshore platforms or ships, but can also be part of dedicated oceanographic stations. They are also used for monitoring drinking water conveyance systems and for monitoring river water.

The paper "*Conception et simulation d'un micro-capteur à ondes de love par éléments finis*", Hallili et al. J3eA, January 2015 available at http://dx.doi.org/10.1051/j3ea/2015018 describes a Love wave sensor for the detection of gaseous species in liquid media. It includes a piezoelectric substrate and two pairs of interdigitated combs, one pair of combs forming an emitter and one pair of combs forming a receiver. Between the two pairs of combs a zone for collecting gaseous species is provided, this zone is referred to as a "gap". The emitter generates a Love wave by virtue of the piezoelectric effect. The wave travels through the gap towards the receiver, with a maximum of energy contained in the guiding layer. After some time (delay time), the acoustic wave arrives at the receiver and is converted into an electrical signal. The propagation speed or amplitude varies depending on the species deposited onto the gap. The surface of the gap is generally covered with a sensitive layer adapted to specifically bind a chemical or biological target.

Any surface submerged in a liquid, such as sea water or fresh water, is subject to the deposition and adhesion of organisms, which may be bacteria, algae or even molluscs. This phenomenon is known as biofouling. When environmental conditions are met, adhesion of microorganisms to materials and their multiplication leads to the formation of a film on the surface of the materials. The formation of this film takes place in several steps and can be particularly quick, for example a few minutes.

The quality of measurements made by submerged sensors can be affected by biofouling being formed on their sensitive surface after only a few days. The gap of the Love wave sensor will be quickly covered with a biofilm which will alter propagation of Love waves.

Therefore, anti-fouling solutions are needed to achieve consistent data quality and to reduce the maintenance required to clean them. Anti-fouling systems are either of the chemical or mechanical type. Chemical systems consist in applying a coating loaded with biocides on the surface to be protected. The toxicity of the biocides contained in the coating allows micro-organisms to be repelled and destroyed. These systems are polluting, in addition they release biocides until they are exhausted, thereby becoming ineffective.

Mechanical type systems, for example, use a windscreen wiper in order to remove micro-organisms deposited onto the sensitive surface. Nevertheless, the wiper itself is subject to biofouling. Further, it requires some maintenance to remain effective.

DISCLOSURE OF THE INVENTION

It is therefore one purpose of the present invention to provide a submerged environmental sensor with improved protection against biofouling.

The above stated purpose is achieved with an environmental sensor including a support carrying a surface, part of which forms a measurement zone, first means for causing at least said measurement surface to vibrate in order to avoid or at least limit formation of a biofouling film and second means for performing a measurement in the measurement zone by means of a wave generation.

The measurement consists, for example, in measuring chemical or biological species contained in the liquid in which the sensor is submerged.

With the invention, the growth of microorganisms on the measurement zone is prevented or already deposited microorganisms are removed; and the measurement of the species of interest, e.g. by wave propagation, is not distorted by the presence of a biofilm.

The waves that can be used for measurement are, for example, Love or Rayleigh waves.

The measurement zone is for example caused to vibrate in an out-of-plane mode or Lamb mode. Advantageously, several modes are excited at different frequencies in order to avoid standing zones, which would allow biofouling to develop.

In one exemplary embodiment, a single actuator provides both the anti-fouling and measurement functions, with the control signal exciting the actuator at several frequencies.

In one exemplary embodiment, the first means also ensures guiding of the species to be measured into the measurement zone.

In other words, the environmental sensor according to the invention incorporates on the same support means for limiting, or even avoiding, biofilm and means for measuring the species of interest in the liquid in which the sensor is submerged. In this way it is possible to maintain an optimal measurement support for measurement in a reduced overall space.

One object of the present application is a submersible environmental sensor including a support, one face of which includes a sensitive zone configured to receive species of interest, antifouling means configured to cause at least the sensitive zone to vibrate, said antifouling means being carried by the support, and means for detecting the presence of at least one species of interest on the sensitive zone, said detection means being carried by the support.

Preferably, the anti-fouling means are configured to cause at least the sensitive zone to vibrate in an out-of-plane vibration mode.

The anti-fouling means are advantageously configured to cause at least the sensitive zone to vibrate in a plate mode, for example a Lamb mode.

The detection means are preferably configured to implement surface waves.

In one example, the detection means includes an emitter of propagating surface waves disposed on one side of the sensitive zone and a receiver of propagating surface waves emitted by the emitter disposed on another side of the sensitive zone.

In another example, the detection means includes means for generating a standing wave in the sensitive zone and for measuring a variation in the resonant frequency of the standing wave.

According to an additional characteristic, the detection means also includes a graphene sensor, and/or a field effect transistor type sensor sensitive to ion concentration variations, and/or an electrochemical sensor, on the sensitive zone.

The sensor may include means forming both the anti-fouling means and the detection means.

According to an additional characteristic, the anti-fouling means are configured to confine the at least one species of interest on the sensitive zone.

In one advantageous example, the sensitive zone includes a functionalisation layer configured to capture the at least one species of interest.

Another object of the present application is an at least partly submersible detection system including at least one environmental sensor according to the invention and a control unit configured to send a first control signal to the anti-fouling means so as to remove microorganisms from the sensitive zone and/or prevent their growth on the sensitive zone, and a second control signal to the detection means to perform detection of the at least one species of interest.

The control unit can be configured to apply frequency sweep to the anti-fouling means in a frequency range exciting the medium in different Lamb modes.

In one exemplary embodiment, the control unit is configured to activate the anti-fouling means before each activation of the detection means.

The control unit can be configured to collect a signal from the second means.

According to another example, the control unit is configured to activate the anti-fouling means so as to confine the at least one species of interest on the sensitive zone.

Another object of the present application is a method for controlling an environmental sensor according to the present application, including Activating the anti-fouling means.

Stopping the anti-fouling means.

Activating the detection means.

Stopping detection means.

Activating the anti-fouling means can take place prior to each activation of the measurement means.

The control method may provide activating the anti-fouling means to confine the at least one species of interest on the sensitive zone.

For example, the control method applies frequency sweep to the anti-fouling means in a frequency range exciting the medium in different Lamb modes.

BRIEF DESCRIPTION OF THE DRAWINGS

The present invention will be better understood based on the following description and the accompanying drawings in which.

DETAILED DESCRIPTION OF PARTICULAR EMBODIMENTS

The present application concerns an environmental sensor with improved protection against biofouling or fouling.

In the present application, "environmental sensor" is intended to mean a sensor designed to detect species of interest contained in the liquid (chemical or biological) environment in which it is submerged.

The species of interest or targets are in the form of particles that will bind to a sensitive zone of the sensor. The surface of the sensor has adhesive properties with respect to the species of interest.

Biofouling can occur in seawater, fresh water in lakes, rivers, tributaries, natural and artificial reserves in public water systems. The measurement system is suitable for use in such environments.

The environmental sensor is submersible in water, either seawater, fresh water or another liquid.

The terms "fouling" and "biofouling" will be considered synonymous in the present application.

The terms "biofilm" and "biofouling" will be considered synonymous in the present application.

By "Anti-fouling action", it is meant preventing the formation of biofilm and/or removing biofilm that has formed.

The sensor can be of different types. It can be designed to monitor parameters such as dissolved oxygen, turbidity, conductivity, pH or even the fluorescence, presence or concentration of some chemical or biological species. The pH is determined, for example, by direct measurement of the $H_3O^+$ ions that bind to the sensitive zone.

Figure 1:
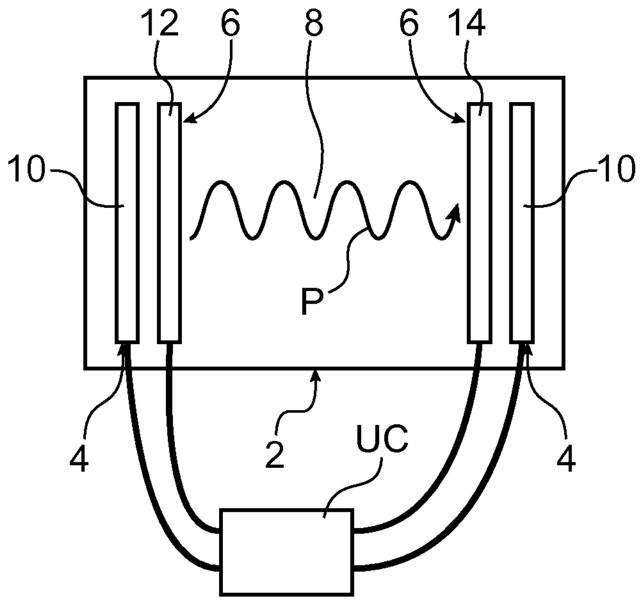
FIG. 1 is a schematic representation of an example of an environmental sensor, wherein the detection means implement a propagating wave.

In FIG. 1, a schematic representation of an example of an environmental sensor including a support 2 can be seen, in the example represented it is a rectangular plate, first means 4 designated as anti-fouling means and second means 6 designated as detection means.

The anti-fouling means 4 are preferably disposed in relation to the detection means 6 so that the entire sensitive zone is subjected to the action of the anti-fouling means. The anti-fouling means can be positioned either on the same face as or on the opposite face to the detection means.

The sensor includes at least one sensitive zone 8 carried by one face of the support. The sensitive zone 8 is the surface that allows the sensor to collect particles of the species of interest to be detected.

In the example represented, the sensitive zone 8 is in the centre of the support and the anti-fouling means and the detection means surround the sensitive zone 8.

In one exemplary embodiment, the sensitive zone 8 includes a sensitive layer (not represented) adapted to the detection of species of interest, this layer is called "biological functionalisation layer". For example, it includes biological macromolecules with the property of specifically binding a chemical or biological target.

The macromolecules can be DNA or RNA strands or proteins with a specific recognition function, such as lectins, enzymes, immunoglobulins. The functionalisation layer provides bioreceptors on the surface of the support, which are specific to one or more target species. These bioreceptors have a high affinity with this target, which is referred to as specific recognition. Particles and/or micro-organisms, in particular those causing biofouling, other than those desired to be detected, could graft themselves onto the functionalisation layer non-specifically, mainly via electrostatic interactions. However, the affinity of these non-specific bonds is much lower, for example by several orders of magnitude, than the affinity characterising the specific recognition reaction. The binding rate of these non-specific organisms to the functionalisation zone would be of the same characteristic as the binding to the other parts of the support (apart from the sensitive zone), the latter is much less favoured than the binding of the specific species targeted by functionalisation.

According to one example, the functionalisation layer includes Single Chain Variable Fragments (scFV), which are fusion proteins allowing a particular recognition site, offering high affinity to the peptide having the antigen corresponding to the scFV fragment (e.g. AR-GCN4), as is described in "*A label free immunosensor array using single-chain antibody fragments*" Natalija Backmann et al. in *PNAS*, Oct. 11, 2005, vol. 102, no. 41, 14587-14592.

According to another example, the functionalisation layer includes a polyclonal antibody PAb against ochratoxin A, allowing the detection of ochratoxin A, called mycotoxin, as described in "*An electrochemical immunosensor for ochratoxin A based on immobilization of antibodies on diazonium functionalized gold electrode*" Abd-Elgawad Radio et al. in *Electrochimica Acta* 54 (2009) 2180-2184.

According to another example, the functionalisation layer includes lectin (group of proteins) and in particular Concanavalin A for detecting *Escherichia coli*, as is described in "*Detection of Escherichia coli with a label-free impedimetric biosensorbased on lectin functionalised mixed self-assembled monolayer*" Haiying Yanga et al, in *Sensors and Actuators* 8 229 (2016) 297-304.

The anti-fouling means are such that they cause the substrate to vibrate so that it imparts an acceleration to the adhering microorganisms and cause them to detach.

The support 2 has a thickness small enough to exhibit significant vibration. The thickness of the support 2 is a function of the material of the support and its mechanical properties. For example, for a polymer or glass support, the thickness of the support may be several mm, or even several tens of mm. In the case of a silicon support, its thickness is advantageously less than one mm or a few mm.

In the example represented, the anti-fouling means include two electromechanical actuators 10 in the form of a strip, disposed on the face of the support 2 carrying the sensitive zone, and each extending along an edge of the support 2. The actuators 10 are preferably piezoelectric or ferroelectric, for example made of PZT, AlN or ZnO. The implementation of piezoelectric or ferroelectric actuators allows proper incorporation of the system and ensures proper coupling between the actuators and the support. The actuators 10 each include electrodes and an element of piezoelectric or ferroelectric material arranged between and in electrical contact with both electrodes.

Alternatively, the electromechanical actuators can be magnetic, electro-active, or shape memory actuators.

Alternatively, each actuator is replaced with several actuators arranged parallel to one edge of the support.

Alternatively, the actuators 10 are confined on the face of the support opposite to that carrying the sensitive zone 8.

The anti-fouling means 4 and the detection means 6 are to be connected to a power source and a control unit UC. The environmental sensor, control unit and power source combination forms a detection system.

The electrodes of the actuators 10 are to be connected to an AC voltage source controlled by the control unit UC. The application of a potential difference between the electrodes induces an electric field in an out-of-plane direction, i.e. normal to the plate. By reverse piezoelectric effect, the electric field causes the piezoelectric material to deform in the out-of-plane direction, and in the plane of the plate. This in-plane deformation induces a mechanical torque that will deform the plate by the bimetal effect. By applying an AC voltage, the plate is caused to vibrate. Preferably, the actuators are dimensioned and disposed on the support 2, so as to generate a vibration mode of the plate capable of ensuring anti-fouling action.

For example, the actuators 10 excite the support 2 in its first out-of-plane vibration mode or in a plate mode, for example a Lamb mode.

Figure 2A:
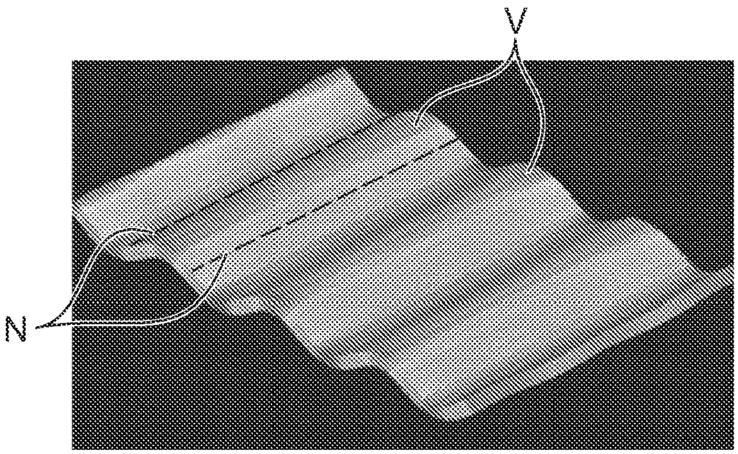
FIGS. 2A, 2B and 2C are schematic representations of rectangular plates excited in a Lamb mode at different frequencies.
Figure 2B:
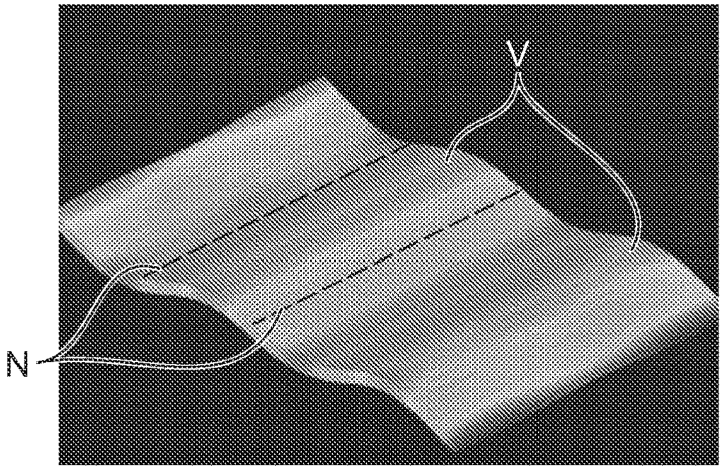
Figure 2C:
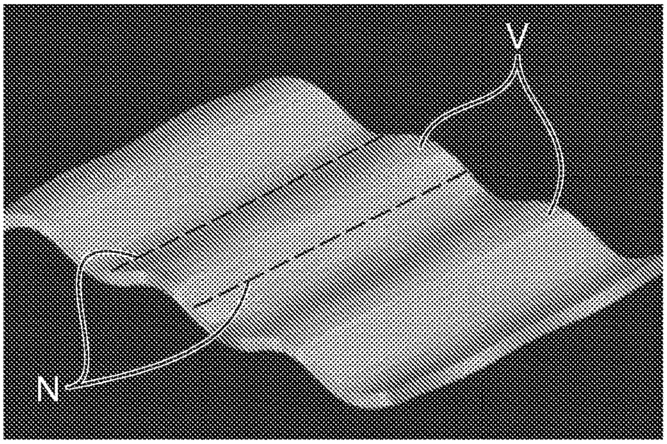

In FIGS. 2A to 2C, supports excited in Lamb modes at three different frequencies with antinodes V and nodes N can be seen represented. The actuators are in strip form and are parallel to the antinodes and nodes. For a 30 mm×20 mm plate. In FIG. 2A, the excitation frequency is 175.4 kHz, in FIG. 2B the excitation frequency is 64 kHz and in FIG. 2C the excitation frequency is 132 kHz.

Preferably, the frequency of the supply voltage to the actuators 10 is chosen so that the plate vibrates at a resonant frequency of the first out-of-plane vibration mode or Lamb mode, thereby maximising vibration of the plate. A transducer in which the plate does not vibrate at its resonant frequency does not depart from the scope of the present invention.

As the Lamb mode is a standing mode, it is advantageously provided to excite the plate in Lamb modes at different frequencies, with the antinodes and nodes at different locations, in order to obtain a uniform anti-fouling action on the plate.

In this example, the detection means implement surface waves, e.g. Love waves or Rayleigh waves, which are emitted in the sensitive zone 8, and whose characteristics depend on the state of the sensitive zone.

In the example represented in FIG. 1, the detection means include an emitter 12 for generating a propagating wave on one side of the sensitive zone, and a receiver 14 for receiving the wave on the other side of the sensitive wave.

The emitter 12 receives an electrical pulse or sinusoidal signal from the control unit UC, and generates a surface wave, for example a Love wave in the sensitive zone. The receiver 14 converts the wave into an electrical signal which is collected by the control unit UC. The presence of the target particles on the sensitive layer in the acoustic path yields a mass effect, which disturbs the wave. By measuring these disturbances, target particles can be detected and their concentration related to the mass effect percentage can be deduced.

For example, the sensitive zone 8 includes a base made of piezoelectric material, in which the surface wave is generated by the piezoelectric effect. Alternatively, the wave directly propagates in the substrate.

Figure 4:
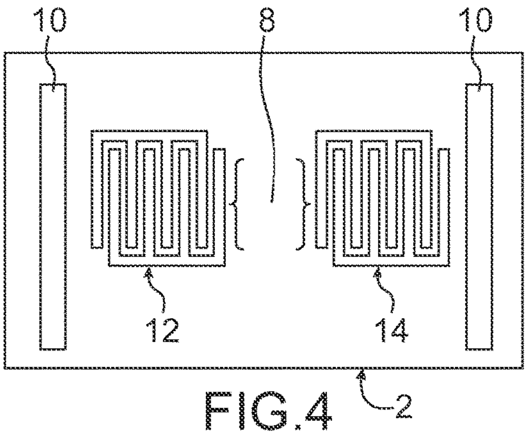
FIG. 4 is a schematic representation of an example of an environmental sensor, wherein the propagating wave detection means include interdigitated combs.

Preferably, the emitter 12 and receiver 14 each have, for example, a pair of interdigitated combs as is represented in FIG. 4.

In another example, the emitter and receiver are in the form of piezoelectric strips and their impedance is measured. This measurement provides the resonant frequency of the system and/or its resonance quality factor. By shifting these quantities, it is possible to determine the particles adhering to the zone of interest. The quality factor is measured, for example, by measuring the Full Width at Half Maximum (FWHM), the quality factor Q=resonant frequency/FWHM. Thus, upon acquiring the resonance curve, not only the resonant frequency but also the quality factor can be obtained. The quality factor is also a measure of the energy dissipated by the resonator during each vibratory cycle. If a layer of material (e.g. biological) binds to the surface of the resonator, this layer will increase the energy that is dissipated by the resonator during each vibratory cycle, thereby decreasing the quality factor.

In another example, the sensor includes piezoresistors on the surface of the substrate, which generate a periodic electrical signal synchronised to the generated wave.

Figure 3:
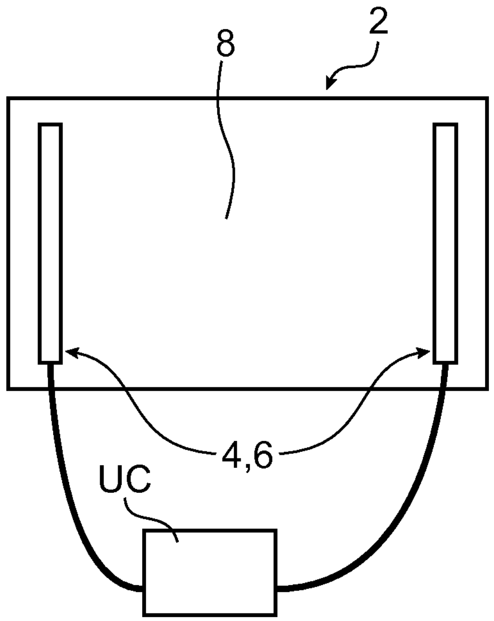
FIG. 3 is a schematic representation of another example of an environmental sensor, wherein the detection means implement a propagating wave.

In FIG. 3, another embodiment in which the anti-fouling means and the detection means are formed by the same actuators can be seen. The actuators are each for example rectangles or a series of squares or rectangles, through which the support can be actuated, but also measurements can be made, e.g. by monitoring the impedance as has been described above.

In the example represented, two actuators are arranged on either side of the sensitive zone, and the control unit sends signals at different frequencies to achieve the anti-fouling action and the detection action. For example, the actuators are actuated at low frequency for the anti-fouling action and one of the actuators is excited at high frequency to generate a propagative wave in the sensitive zone. Alternatively, pairs of interdigitated combs form both the anti-fouling means and the detection means.

Figure 5:
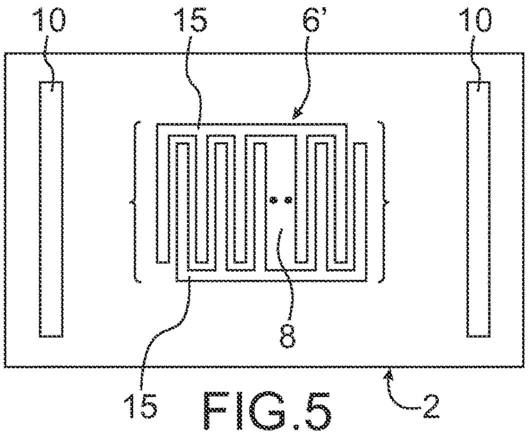
FIG. 5 is a schematic representation of another example of an environmental sensor, wherein the detection means implement a standing wave.

In another example represented in FIG. 5, the detection means 6' operate in resonator mode, i.e. they generate standing waves in the sensitive zone 8 and measure the resonant frequency variation.

In this example, the sensor includes actuators forming the anti-fouling means 4 similar to those of FIG. 1, and detection means 6' including a pair of interdigitated combs 15 disposed vertically aligned with the sensitive zone 8, which generates, in the sensitive zone 8, a standing surface wave, and which also measures the variation in resonant frequency of the wave emitted. Alternatively, quality factor monitoring can be performed in addition to or instead of resonant frequency monitoring. Quality factor monitoring has the added advantage of providing access to other characteristics, such as the Young's modulus of the particles detected or their degree of hydration.

In the examples described, the support and the sensitive zone are rectangular in shape, but it will be understood that a support and/or sensitive zone of any other shape does not depart from the scope of the present invention. For example, the support may be disc-shaped and a disc-shaped sensitive zone is defined, using disc-shaped, ring-shaped or arc-shaped actuators.

An example of operation of the environmental sensor in FIG. 1 will now be described.

The environmental sensor is submerged and the anti-fouling means 4 and the detection means 6 are switched off. The support 2 is stationary.

A de-fouling phase is controlled. The control unit UC applies an electrical signal to the pair of actuators, for example an alternating electrical signal, preferably at the resonant frequency of the mode sought, for example the Lamb mode. Alternatively, a frequency sweep in a frequency range involving the different desired modes is applied to achieve uniform de-fouling of the sensitive zone. The substrate is then caused to vibrate, imparting an acceleration to the microorganisms on the sensitive zone, which are then ejected, and preventing the growth of microorganisms. The anti-fouling means can be actuated for preventive or curative action.

The anti-fouling means are discontinuously, for example periodically, activated. By way of example, they can be activated once an hour or once a day. The frequency of activation, the duration of activation and the amplitude and/or frequency of the vibrations are chosen depending on the ability of the liquid to form a biofilm and/or the ability of the sensitive surface to be covered with microorganisms. The anti-fouling means can be activated only during a measurement cycle, prior to the measurement phase, or periodically with a higher frequency than the measurement phases.

It should be noted that the sedimentation of the particles of interest on the sensitive zone 8 is quicker than the formation of the biofouling film on this zone.

Then, the control unit UC stops the anti-fouling means and starts a detection phase. In particular, the anti-fouling means are stopped during the measurement phases so as not to disturb the measurements, especially so as not to eject the particles of interest during the measurement.

The control unit UC then starts a measurement phase, sending a signal to the detection means to generate a surface wave in the sensitive zone. Prior to this, a sedimentation phase can be provided to allow the species of interest suspended in the liquid to sediment on the sensitive zone 8. This sedimentation may be passive, with the sensor being dormant, or, as will be described below, the sedimentation may be active, with the actuators of the anti-fouling means being controlled to guide sedimentation.

The control unit sends an electrical signal into the emitter 12 which generates a propagating wave P, for example a Love or Rayleigh wave. The wave propagates in the sensitive zone 8 towards the receiver 14, this wave is impacted by the environment, that is impacted by the presence or not of the chemical species or bacteria to be detected on the sensitive zone 8. The reading of the signal by the receiver 14, resulting from the arrival of the wave generated and impacted by the environment, makes it possible to characterise the mass of biological objects that has been grafted to the sensitive zone of the sensor during the time of sedimentation and measurement.

The duration of the measurement is less than the time required for a biofilm to form that could distort the detection of the particles of interest. For example, the measurement phase lasts about fifteen minutes, and the time required for the formation of a biofouling film that could disturb the measurement would be in the order of several hours or tens of hours . . . .

In the example of FIG. 5, where the wave generated is a standing wave, this is kept excited for the entire duration of the measurement and the frequency of this wave is measured. When grafting biological species onto the sensitive zone, the resonant frequency varies, generally decreases due to this additional grafted mass, which constitutes the useful detection signal.

The control unit stops the detection means. These can be activated periodically. By way of example, they can be activated once an hour, or once a day, to monitor the quality of the liquid in which the sensor is submerged.

The anti-fouling means can be activated at the end of the measurement to eject cells of interest or they will be ejected during the next biofilm removal phase.

In another exemplary embodiment, the detection of chemical or biological objects in a liquid medium can be achieved by another type of biological sensor, which is attached to the support in the sensitive zone 8. For example, a graphene sensor can be used; it is capable of detecting grafting of biological species via their charge. For example, graphene is on the sensitive zone.

Alternatively, it can be contemplated to implement several sensors of different types, for example a surface wave sensor and a graphene sensor, each occupying a part of the sensitive zone, and/or an Ion Selective Field Effect Transistor (ISFET) type sensor as described in document "*A Scalable ISFET Sensing and Memory Array With Sensor Auto-Calibration for On-Chip Real-Time DNA Detection*", Nicolas Moser et al. in *IEEE TRANSACTIONS ON BIOMEDICAL CIRCUITS AND SYSTEMS*, VOL. 12, NO. 2, APRIL 2018, and/or an electrochemical sensor, as described in document "*Aptamer-Based Electrochemical Biosensor for Interferon Gamma Detection*", Ying Liu et al. in *Anal. Chem.* 2010, 82, 8131-8136.

The sensor can also make it possible to measure the density and/or viscosity of the liquid by measuring the resonant frequency and quality factor of the vibrating plate interacting with the liquid medium, especially when Lamb waves are implemented. The sensitive zone is formed by the vibrating plate itself. Equations make it possible to determine density/viscosity as a function of the vibration measurement. This determination is described, for example, in document Neff et al. "*Piezoelectric Actuated Glass Plate for Liquid Density and Viscosity Measurement", Micromachines Journal,* 11, 248, doi:10.3390/mi11040348.

Figure 6:
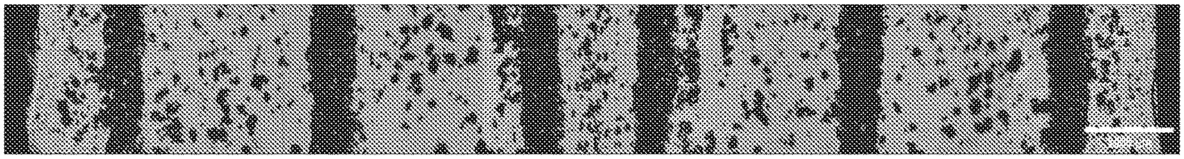
FIG. 6 represents confining of particles of interest on a rectangular support excited in a Lamb mode at 100 kHz.
Figure 7:
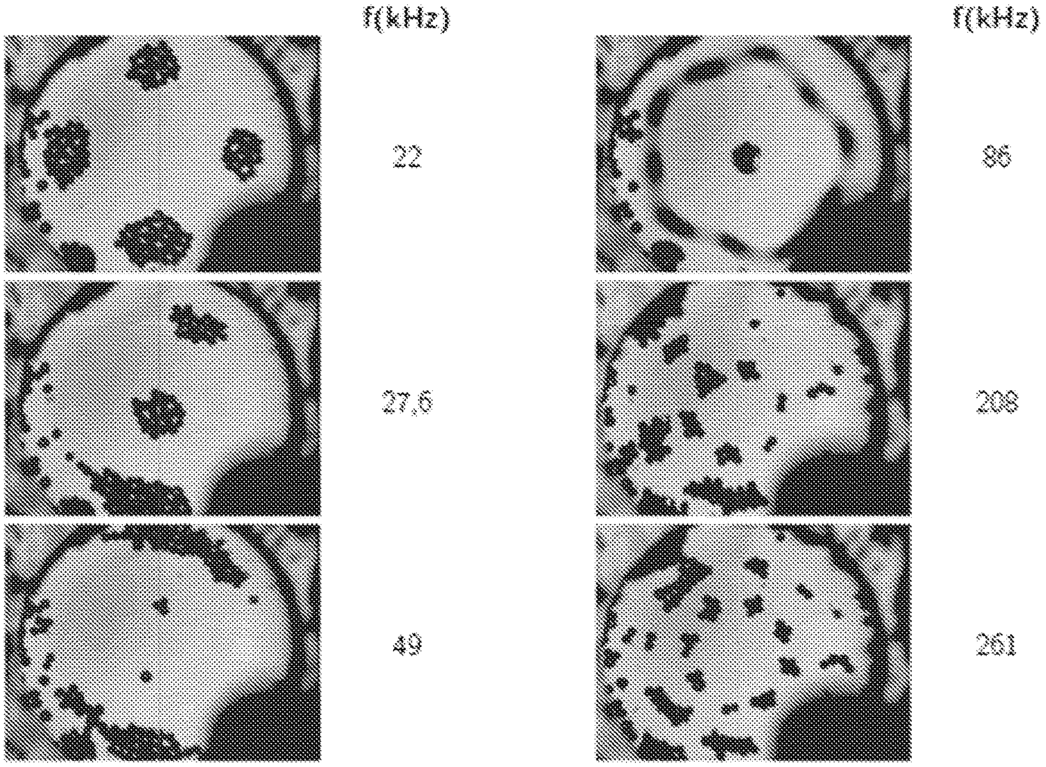
FIG. 7 represents confining of particles of interest on a disc-shaped support excited in an out-of-plane mode at different frequencies.

In one operating mode of the sensor, it may be provided that the species in the liquid can be guided so as to confine their attachment to the sensitive zone. For example, cells of interest are guided towards the vibrational antinodes, i.e. zones of highest amplitude of the plate, depending on the mode of the vibrating structure. This confining can be in the form of a strip as is represented in FIG. 6 on a 40 mm×30 mm glass plate, the plate being excited in the Lamb mode at a frequency in the order of 100 kHz, and confining can be in any other form on a membrane in the form of a disc having radius 800 μm, as is represented in the images of FIG. 7 excited in the $1^{st}$ out-of-plane mode, the excitation frequencies being indicated next to each image.

The control unit UC, in a mode of confining species of interest, is configured to activate actuators so as to cause the medium 4 to vibrate in a standing wave mode having a wavelength λ greater than the size of the cells of interest.

As explained above, the plate actuated in a standing mode, for example a Lamb mode, will deform and have zones moving with maximum amplitude, called "antinodes", and fixed zones called "nodes". The nodes remain in the plane of the plate, the plane of the plate containing the plate at rest.

The wavelength of the deformation is designated A and covers an antinode and a trough. In the species-of-interest-confining mode of operation, the wavelength of the standing wave of the plate deformation is between 3 and 20 times the cell size, preferably 10 times the cell size. Preferably, the actuators have a width substantially equal to the size of an antinode.

The amplitude of the resonance mode is sufficient to move the liquid and thus the cells suspended therein. Typically the amplitude is between a few tens of nm and a few micrometres.

The location of the actuators and their size can be determined using finite element analysis software, such as COMSOL®, ANSYS® or COVENTOR®, from the deformation in the vibration mode chosen. The resonant frequency of this mode and the amplitude can also be determined by finite element simulation and/or analytical calculation. The frequency and amplitude are a function of the voltage applied to the actuators.

The determination of the actuators can be done as explained in document Casset et al, "Low voltage actuated plate for haptic applications with PZT thin-film", Proceedings of Transducers 2013.

Activation of the actuators takes place during sedimentation and before the cells adhere to the accommodating surface. The actuators can be activated before the cells are injected.

The C-cells are then distributed on top of the accommodating surface 8 and more particularly on top of the vibration antinodes of the sensitive surface 8 and move away from the vibration nodes. The species sediment on the sensitive surface 8 and adhere thereto. Alternatively, the actuators can be activated until all species have sedimented or can be switched off upon sedimenting.

The arrangement of the actuators in FIG. 1 allows the cells to be confined in a line along the antinodes.

By changing the shape and distribution of the actuators other confining operations are feasible. For example, by distributing the actuators in a grid and choosing a checkerboard mode of actuation, cells are confined in a checkerboard pattern.

It can be contemplated to confine different cells in succession in different patterns by changing the actuation modes of the plate. For example, the cells are injected successively into the fluidic cavity, with each injection the mode of actuation being changed. Confined cell deposits successively made are possible because cell migration is not an instantaneous phenomenon.

This possibility of particle confining is also described in G. Vuillermet et al. Vuillermet et al. "*Inverse Chladni patterns in liquids at microscale", Physical Review Letters* 116(18) May 2016.

By way of example, examples of dimensioning the actuators 10 of anti-fouling means will be described.

Adhesion forces of the organisms on the sensitive zone are variable depending on the organism considered. Adherent biological cells for which the adhesion forces are between 1 nN and 500 nN are considered. By estimating the mass of a eukaryotic cell—1 ng, the orders of magnitude of the necessary frequencies of vibration of the vibrating plate can be evaluated from the formula:

$$f \approx \frac{1}{2\pi}\sqrt{\frac{F_{adh}}{m\delta}}$$

With a vibration amplitude of δ~1 μm, this gives an order of magnitude of the minimum frequencies to be involved in the order of 1 kHz to 10 kHz. The supports in FIGS. 2A to 2C show simulated frequencies in this range.

Dimensioning of actuators in a Lamb mode operating mode is for example described in document Cosset et al, "*Low voltage actuated plate for haptic applications with PZT thin-film", Proceedings of Transducers* 2013, PRL 116, 184501 (2016), pages 1-5.

This configuration of actuators makes it possible to have a vibration amplitude and thus a homogeneous force map on the surface. The actuators will be positioned in such a way as to favour the mode or modes sought.

For example, two 1500 μm wide actuator columns, positioned 2200 μm from the end of the plate, provide the wanted deformation amplitude for the indicative frequency of 175 kHz. 2000 μm wide actuators, the first one positioned 4250 μm from the end of the plate, and the second one spaced 17350 μm from the first one, provide a mode at a frequency of 64 kHz.

The implementation of several actuators allows for larger vibration amplitudes. Nevertheless, anti-fouling means using a single actuator are contemplatable.

In a non-limiting way, actuators can be positioned close to the external edge(s) of the support, or be confined on two consecutive vibration antinodes.

Figure 8:
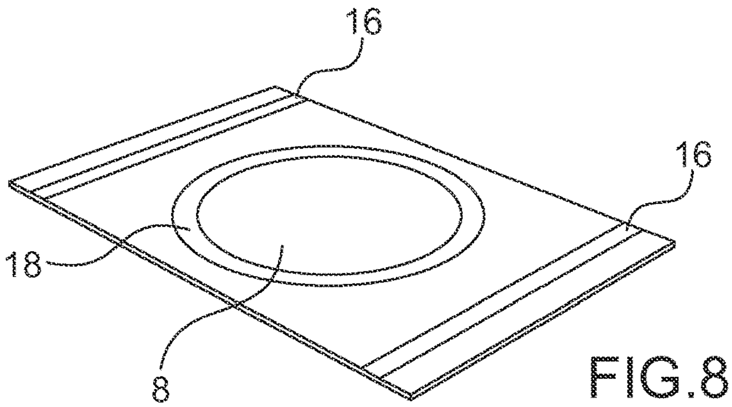
FIG. 8 is an example of a support provided with anti-fouling means for causing the support to vibrate in several modes.
Figure 9A:
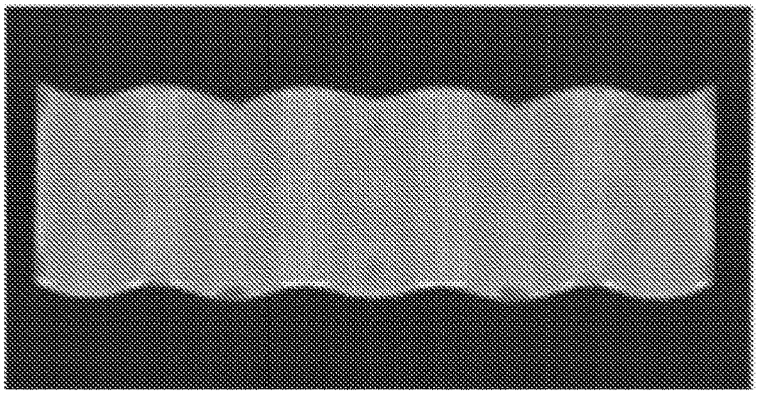
FIG. 9A is a representation of the support of FIG. 8 excited in a Lamb mode.
Figure 9B:
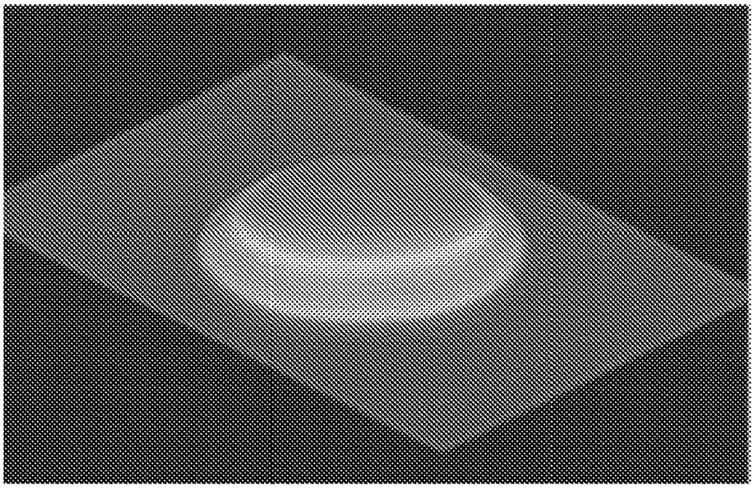
FIG. 9B is a representation of the support of FIG. 8 excited in an out-of-plane mode.

Additionally, in order to excite the medium in multiple modes, a single actuator may be used, or multiple sets of actuators may be used, each generating one or more modes. For example, in FIG. 8, the anti-fouling means includes a pair of first actuators 16 in the form of a strip extending on either side of the sensitive zone and parallel to two opposite edges and a second actuator 18 in the form of a ring surrounding the sensitive zone 8. The first actuators can excite the sensitive zone in a Lamb mode (FIG. 9A) and the second actuator can excite the sensitive zone in a first out-of-plane mode (FIG. 9B). It should be noted that the second actuator allows the out-of-plane deformation to be confined to the zone surrounded by the second actuator.

Alternatively, the anti-fouling means and the detection means are carried by opposite sides of the support.

The invention makes it possible to make sensors with large dimensions which are defined by the dimensions of the support. It is therefore possible to analyse large volumes of liquid.

An example of a method for manufacturing an environmental sensor shown in FIG. 1 will now be described.

On a substrate 100, for example of semiconductor such as silicon or glass, a piezoelectric stack is formed, for example including an AlN layer 104 between two Mo layers 102 and 106. This stack is formed for example by full plate deposition using a sputtering technique. For example the AlN layer is 2 μm thick and the Mo layers are 200 nm thick.

Figure 10A:
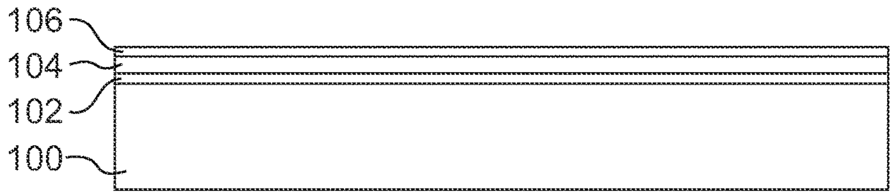
FIGS. 10A, 10B, 10C, 10D, 10E and 10F are schematic representations of the elements obtained during different steps of an example of a method for manufacturing an environmental sensor according to the invention.

The element thus formed is represented in FIG. 10A.

In a next step, the layer 106 is structured, for example by etching, to form the electrodes 110 of the actuators 10 of the anti-fouling means 4 and the interdigitated forming the emitter 12 and receiver 14 electrodes of the detection means 6. For this, it is possible to use chemical etching or plasma etching steps.

Figure 10B:
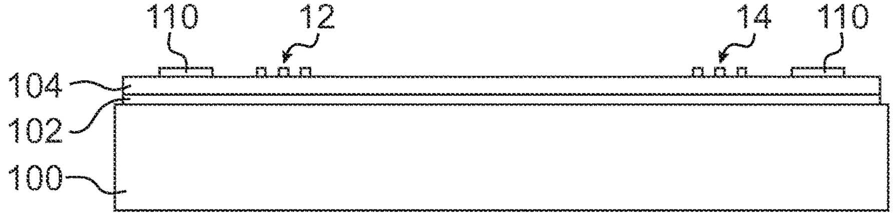

The element thus formed is represented in FIG. 10B.

In a next step, the AlN layer 104 is structured in order to separate the piezoelectric elements 112 of anti-fouling means and the piezoelectric layer 114 forming the base of the sensitive zone 8. For example the layer 104 is etched, for example by chemical etching.

Figure 10C:
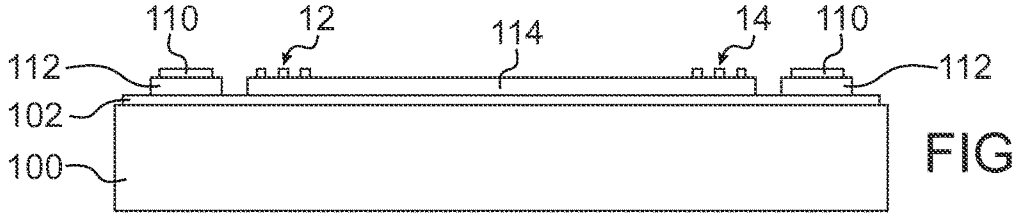

The element thus formed is represented in FIG. 10C.

In a next step, the layer 102 is structured, for example etched, in order to form the electrodes 116 of the anti-fouling means. The layer 116 is present under the detection means but is not used as an electrode.

Figure 10D:
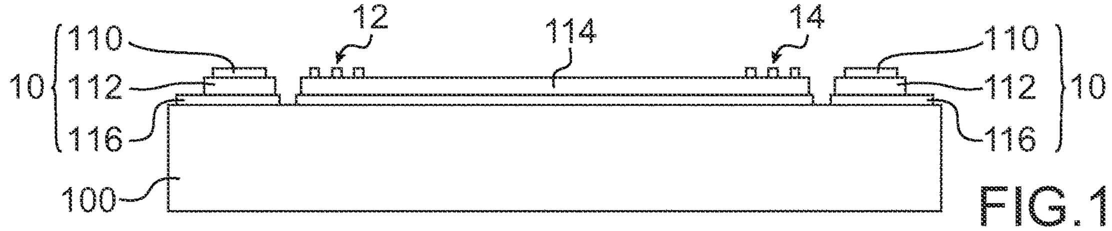

The element thus formed is represented in FIG. 10D.

In a next step, a passivation layer 118 is formed over the entire element of FIG. 10D, in order to insulate the actuators from the external environment. The passivation material is for example $SiO_2$. The passivation layer 118 is for example 300 nm thick. The passivation layer 118 is opened, for example by etching, in line with the electrodes to allow their subsequent electrical connection. In this example, the passivation layer 118 has been etched on the sensitive zone. Alternatively, the passivation layer 118 can be retained on the sensitive zone.

Figure 10E:
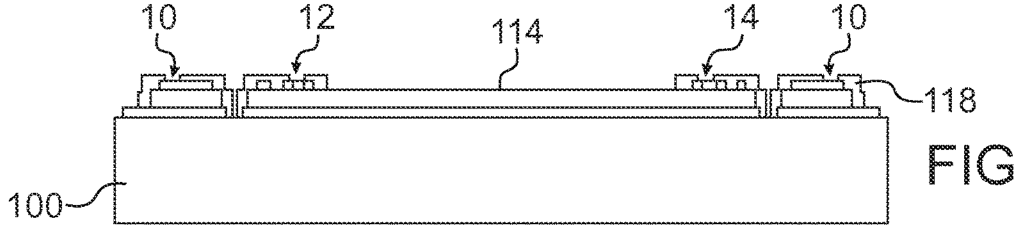

The element thus formed is represented in FIG. 10E.

In a next step, the connection lines and pads 120 are made in the open portions of the passivation layer, for example by depositing and etching a gold layer it. The gold layer has a thickness of 500 nm, for example.

Figure 10F:
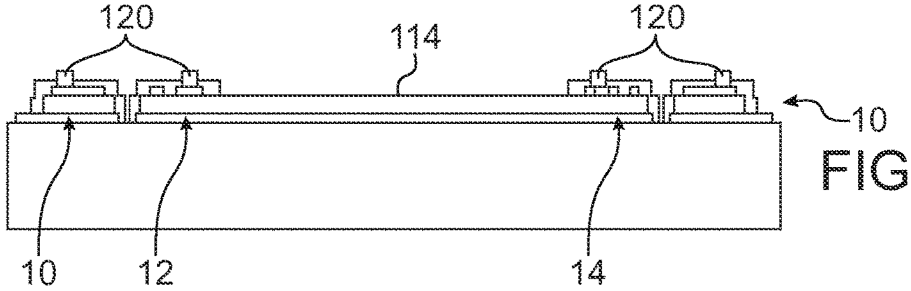

The element thus formed is represented in FIG. 10F.

Preferably, several sensors are made simultaneously on the same substrate and then individualised, for example by cutting.

The invention claimed is:

1. A method for controlling a submersible environmental sensor, the sensor including a support, one face of which includes a sensitive zone configured to receive at least one species of interest, anti-fouling means configured to cause at least the sensitive zone to vibrate, the anti-fouling means being carried by the support, and detection means for detecting a presence of at least one species of interest on the sensitive zone, the detection means being carried by the support, wherein the anti-fouling means includes actuators configured to cause the medium to vibrate in a standing mode with wavelength between 3 times and 20 times the given size of the species of interest ensuring confining of the at least one species of interest on the sensitive zone, the method comprising:

activating the anti-fouling means in a de-fouling mode,
stopping the anti-fouling means,
activating the anti-fouling means to confine the at least one species of interest in the sensitive zone,
stopping the anti-fouling means,
activating the detection means, and
stopping the detection means.

2. The method according to claim 1, wherein the anti-fouling means is configured to cause at least the sensitive zone to vibrate in an out-of-plane vibration mode.

3. The method according to claim 1, wherein the anti-fouling means is configured to cause at least the sensitive zone to vibrate in a plate mode.

4. The method according to claim 1, wherein the detection means is configured to implement surface waves.

5. The method according to claim 4, wherein the detection means includes an emitter of propagating surface waves disposed on one side of the sensitive zone and a receiver of propagating surface waves emitted by the emitter disposed on another side of the sensitive zone.

6. The method according to claim 4, wherein the detection means includes means for generating a standing wave in the sensitive zone and for measuring a variation in a resonant frequency of the standing wave.

7. The method according to claim 1, wherein the detection means also includes, on the sensitive zone, at least one of a graphene sensor, an Ion Selective Field Effect Transistor type sensor, and an electrochemical sensor.

8. The method according claim 1, including means forming both the anti-fouling means and the detection means.

9. The method according to claim 1, wherein the sensitive zone includes a functionalisation layer configured to capture the at least one species of interest.

10. The method according claim 1, wherein the submersible environmental sensor is part of an at least partly submersible detection system including a control unit configured to send a first control signal to the anti-fouling means so as to remove micro-organisms from the sensitive zone and/or prevent their proliferation on the sensitive zone, and a second control signal to the detection means to perform detection of the at least one species of interest.

11. The method according to claim 10, wherein the anti-fouling means is configured to cause at least the sensitive zone to vibrate in a plate mode, and the control unit is configured to apply a frequency sweep to the anti-fouling means in a frequency range exciting the medium in different Lamb modes.

12. The method according to claim 10, wherein the control unit is configured to activate the anti-fouling means before each activation of the detection means.

13. The method according to claim 10, wherein the detection means includes an emitter of propagating surface waves disposed on one side of the sensitive zone and a receiver of propagating surface waves emitted by the emitter disposed on another side of the sensitive zone, and the control unit is configured to collect a signal emitted from the detection means.

14. The method according to claim 10, wherein the control unit is configured to activate the anti-fouling means so as to confine the at least one species of interest on the sensitive zone.

15. The method according to claim 1, wherein activating the anti-fouling means in de-fouling mode takes place prior to each activation of the detection means.

16. The method according to claim 1, wherein the detection means includes an emitter of propagating surface waves disposed on one side of the sensitive zone and a receiver of propagating surface waves emitted by the emitter disposed on another side of the sensitive zone, the method including applying a frequency sweep to the antifouling means in a frequency range exciting the medium in different Lamb modes.

* * * * *